Patented Aug. 25, 1925.

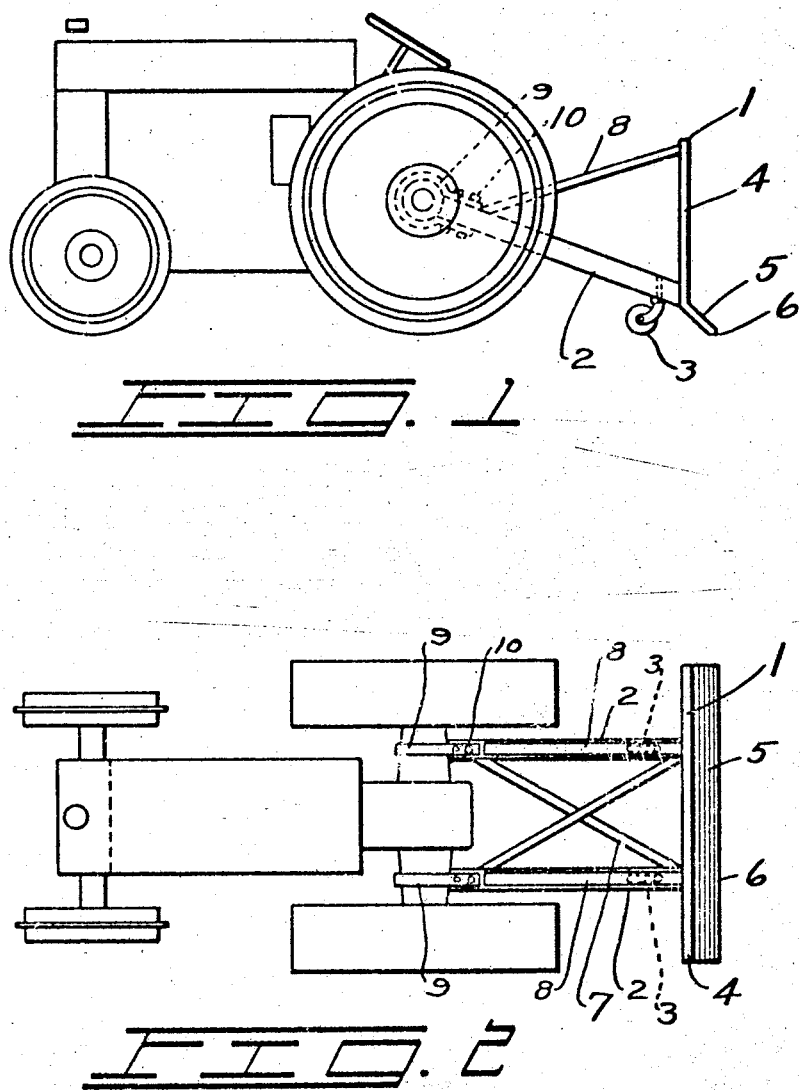

1,550,780

UNITED STATES PATENT OFFICE.

ALEXANDER CERASOLI, OF SEATTLE, WASHINGTON.

DITCH FILLER.

Application filed March 6, 1925. Serial No. 13,450.

*To all whom it may concern:*

Be it known that I, ALEXANDER CERASOLI, a subject of the King of England, residing at Seattle, county of King, and State of Washington, have invented a new and useful Ditch Filler; and I do hereby declare that the following is a full, clear, and exact specification, such as will enable others skilled in the art to which it appertains to make and use the same.

The invention is a device that may be attached to the rear axle of a tractor and used for scooping loose dirt into ditches or the like by moving the tractor backward and forward.

The object of the invention is to provide a device that may be readily attached to tractors or the like by which loose soil may readily be scooped into ditches or the like.

Another object of the invention is to provide a baffle plate that may readily be attached to tractors or the like that is provided with means for holding it a predetermined distance from the ground.

And a further object of the invention is to provide a scoop for tractors or the like which is of a simple and economical construction.

With these ends in view, the invention embodies a vertical plate with a short beveled plate at its lower edge, beams extending backward from the plate with braces to support it, straps for attaching the ends of the beams to an axle or the like and rollers on the under sides of the beams adjacent the plate.

Other features and advantages of the invention will appear from the following description taken in connection with the drawings, wherein:—

Fig. 1 is a side view of a tractor showing the device in place.

Figure 2 is a plan view.

In the drawings I have shown my device as it would be constructed wherein numeral 1 indicates the scoop, numeral 2 the struts or beams, and numeral 3 the rollers.

The scoop 1 is made of a vertical plate 4 having a beveled section 5 at its lower edge and the outer edge 6 of the beveled section pointed as shown. The plate is supported by a frame having beams 2 at each side, diagonal struts 7 between the beams and braces 8 extending from the inner ends of the beams to the upper edge of the plate. The beams 2 are provided with straps 9 at their inner ends which may be placed around an axle or the like as shown and held by bolts 10 so that the inner ends of the beams will bear against the surface of the axle.

The outer ends of the beams 2 are provided with rollers 3, which may be in the form of casters, so that they will roll in any direction.

It will be understood that changes may be made in the construction without departing from the spirit of the invention. One of which changes may be in the use of any other suitable means for attaching the beams to the axle or the like, another may be in the design of the plate 1, and still another may be in the use of any other suitable rollers.

The construction will be readily understood from the foregoing description. To use the device, it may be attached to a tractor as shown in the drawing and it will be observed that as the tractor is moved backward and forward, the scoop will engage the soil or any objects with which it may come in contact and move them; and it will be observed that when it is desired to replace loose soil into a ditch, hole or other opening, the tractor may be moved backward and forward so that the soil or other objects may readily be scooped into the ditch or the like.

Having thus fully described the invention, what I claim as new and desire to secure by Letters Patent, is:—

In a device for filling ditches or the like, a substantially vertical plate, an outwardly inclined plate at the lower edge of the vertical plate, main supporting beams upwardly inclined and extending backward from the lower edge of the vertical plate, casters pivotally attached to the lower side of the main supporting member adjacent the plate, straps at the opposite ends of the main supporting members for attaching them to an axle or the like and struts connecting the upper edge of the vertical plate to the outer end of the main supporting member.

ALEXANDER CERASOLI.